US012737896B2

(12) United States Patent
Yang et al.

(10) Patent No.: US 12,737,896 B2
(45) Date of Patent: Sep. 15, 2026

(54) METHOD FOR IMAGE SEGMENTATION AND SYSTEM THEREFOR

(71) Applicant: SAMSUNG SDS CO., LTD., Seoul (KR)

(72) Inventors: Hee Sung Yang, Seoul (KR); Jun Ho Kang, Seoul (KR); Do Hyung Im, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 408 days.

(21) Appl. No.: 18/535,369

(22) Filed: Dec. 11, 2023

(65) Prior Publication Data

US 2024/0354963 A1 Oct. 24, 2024

(30) Foreign Application Priority Data

Apr. 20, 2023 (KR) ........................ 10-2023-0051755

(51) Int. Cl.
*G06T 7/215* (2017.01)
*G06T 7/12* (2017.01)
(Continued)

(52) U.S. Cl.
CPC ................ *G06T 7/215* (2017.01); *G06T 7/12* (2017.01); *G06V 10/25* (2022.01); *G06V 10/764* (2022.01);
(Continued)

(58) Field of Classification Search
CPC ... G06T 7/215; G06T 7/12; G06T 7/11; G06T 7/10; G06T 2207/20084; G06T 2207/20081; G06V 10/25; G06V 10/764; G06V 10/771; G06V 10/82; G06V 10/70; H04N 5/272; H04N 7/157; G10L 15/04
See application file for complete search history.

(56) References Cited

U.S. PATENT DOCUMENTS 10,311,578 B1 6/2019 Kim et al.
12,067,733 B2 * 8/2024 Cui ...................... G06V 10/462
(Continued)

FOREIGN PATENT DOCUMENTS

CN 111950444 A 11/2020
CN 110321761 B 2/2022
(Continued)

OTHER PUBLICATIONS

Ding et al., "Language-Bridged Spatial-Temporal Interaction for Referring Video Object Segmentation", 2022 IEEE/CVF Conference on Computer Vision and Pattern Recognition (CVPR), 2022, 10 total pages, doi:10.1109/CVPR52688.2022.00491.

*Primary Examiner* — John B Strege
(74) *Attorney, Agent, or Firm* — Sughrue Mion, PLLC

(57) ABSTRACT

Provided are a method for image segmentation and a system therefor. The method according to some embodiments may include acquiring a deep learning model trained through an image segmentation task, extracting motion information associated with a current frame of a given image, and performing image segmentation for the current frame by reflecting the extracted motion information into class-specific feature maps of the deep learning model, the class-specific feature maps being generated by the deep learning model based on the current frame.

15 Claims, 11 Drawing Sheets

(51) Int. Cl.

| | |
|---|---|
| ***G06V 10/25*** | (2022.01) |
| ***G06V 10/764*** | (2022.01) |
| ***G06V 10/771*** | (2022.01) |
| ***H04N 5/272*** | (2006.01) |
| ***H04N 7/15*** | (2006.01) |

(52) U.S. Cl.
CPC ........... *G06V 10/771* (2022.01); *H04N 5/272* (2013.01); *H04N 7/157* (2013.01)

(56) References Cited

U.S. PATENT DOCUMENTS

| | | | | |
|---|---|---|---|---|
| 2019/0355128 | A1* | 11/2019 | Grauman | G06T 7/11 |
| 2020/0027247 | A1* | 1/2020 | Minnen | G06N 3/08 |
| 2022/0109838 | A1* | 4/2022 | Guruva reddiar | H04N 19/46 |
| 2022/0148284 | A1* | 5/2022 | Kim | G06V 10/24 |
| 2023/0145028 | A1* | 5/2023 | Oh | G06V 10/7715<br>382/155 |
| 2023/0319413 | A1* | 10/2023 | Manzari | H04N 23/632<br>348/211.11 |
| 2023/0419522 | A1* | 12/2023 | Yang | G06T 7/70 |
| 2023/0421719 | A1* | 12/2023 | Zhu | G10L 15/26 |
| 2024/0056322 | A1* | 2/2024 | Kare | H04L 12/18 |
| 2025/0104423 | A1* | 3/2025 | Wen | G06V 10/82 |

FOREIGN PATENT DOCUMENTS

| | | | |
|---|---|---|---|
| CN | 112862828 | B | 11/2022 |
| CN | 115393491 | A | 11/2022 |
| KR | 10-2019-0067680 | A | 6/2019 |

* cited by examiner

FIG. 8

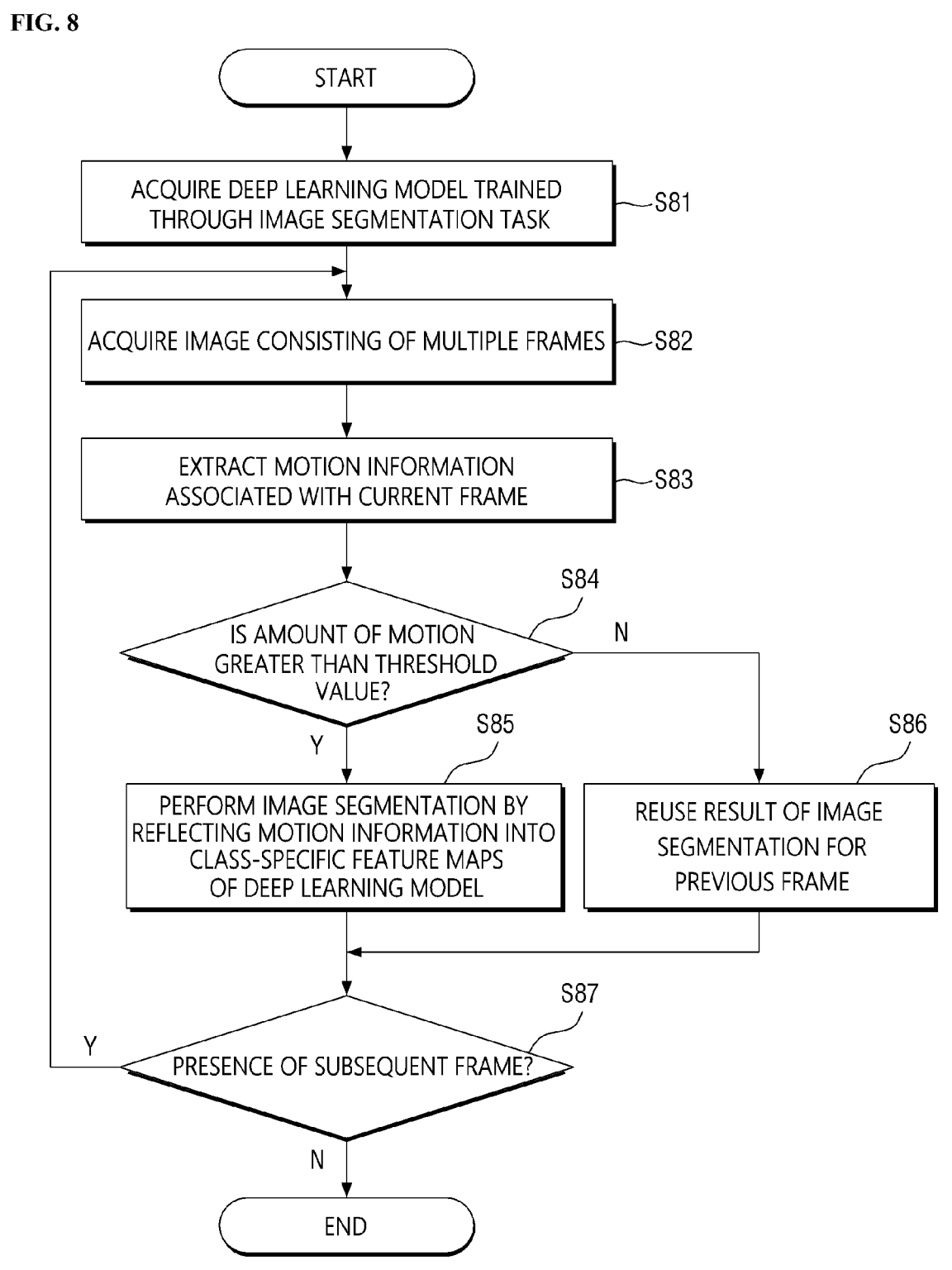

START

ACQUIRE DEEP LEARNING MODEL TRAINED THROUGH IMAGE SEGMENTATION TASK (S81)

ACQUIRE IMAGE CONSISTING OF MULTIPLE FRAMES (S82)

EXTRACT MOTION INFORMATION ASSOCIATED WITH CURRENT FRAME (S83)

IS AMOUNT OF MOTION GREATER THAN THRESHOLD VALUE? (S84)

Y: PERFORM IMAGE SEGMENTATION BY REFLECTING MOTION INFORMATION INTO CLASS-SPECIFIC FEATURE MAPS OF DEEP LEARNING MODEL (S85)

N: REUSE RESULT OF IMAGE SEGMENTATION FOR PREVIOUS FRAME (S86)

PRESENCE OF SUBSEQUENT FRAME? (S87)

Y: return to S82

N: END

METHOD FOR IMAGE SEGMENTATION AND SYSTEM THEREFOR

CROSS-REFERENCE TO RELATED APPLICATION

This application claims priority from Korean Patent Application No. 10-2023-0051755 filed on Apr. 20, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a method for image segmentation and system therefor, and more particularly, to a method for image segmentation using deep learning technology and a system performing the image segmentation method.

2. Description of the Related Art

Image segmentation, which is a deep learning task classifying classes in units of pixels, aims to precisely detect object regions within images. Deep learning models for performing image segmentation are typically trained using training sets consisting of still images and mask images (i.e., segmentation labels).

Currently, deep learning-based image segmentation techniques are widely used in various applications handling images (or videos) to achieve accurate object detection. For instance, in most applications dealing with footages from cameras (e.g., webcams, CCTVs, etc.), deep learning models trained on still images are directly applied to perform image segmentation on a frame-by-frame basis.

However, the mentioned approach has a drawback in that it does not achieve high segmentation accuracy for images with significant object motion. Specifically, this approach fails to consistently and robustly detect objects within images, especially in the presence of dynamic object movement, due to substantial variations in segmentation accuracy from frame to frame.

SUMMARY

Aspects of the present disclosure provide an image segmentation method and system capable of improving image segmentation accuracy for images (e.g., videos).

Aspects of the present disclosure also provide an image segmentation method and system capable of improving image segmentation accuracy without additional training of deep learning models.

Aspects of the present disclosure also provide an image segmentation method and system capable of reducing the computational cost required for image segmentation for images.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the present disclosure, there is provided a method for image segmentation performed by at least one computing device. The method may include: acquiring a deep learning model trained through an image segmentation task; extracting motion information associated with a current frame of a given image; and performing image segmentation for the current frame by reflecting the extracted motion information into class-specific feature maps, the class-specific feature maps being generated by the deep learning model based on the current frame.

In some embodiments, the extracted motion information may be not used in the training of the deep learning model.

In some embodiments, the performing the image segmentation may include performing the image segmentation for the current frame based on an amount of motion associated with the current frame being equal or greater than a threshold value, and a result of image segmentation for a previous frame may be used in performing the image segmentation for the current frame based on the amount of motion associated with the current frame being less than the threshold value.

In some embodiments, the extracting the motion information may include: determining a reference frame from among a plurality of frames included in the given image; and extracting the motion information associated with the current frame based on a difference between the current frame and the reference frame.

In some embodiments, a difference in a frame number between the current frame and the reference frame may be determined to be greater based on a higher frame rate of a device that has captured the given image.

In some embodiments, a difference in a frame number between the current frame and the reference frame may be determined to be smaller based on a higher resolution of a display that outputs the given image.

In some embodiments, a difference in a frame number between the current frame and the reference frame may be determined to be smaller based on a higher importance of an object within the current frame.

In some embodiments, the object may correspond to a user that participates in a video conference and an importance of the object is determined based on at least one of an amount of an utterance or a role of the user during the video conference.

In some embodiments, the extracted motion information includes motion information of a first object and motion information of a second object, the first object and the second object being within the current frame, and the performing the image segmentation may include: reflecting the motion information of the first object into a feature map of a first class corresponding to the first object; and reflecting the motion information of the second object into a feature map of a second class corresponding to the second object.

In some embodiments, the extracted motion information is two-dimensional (2D) data, and the reflecting the motion information of the first object into the feature map of the first class corresponding to the first object may include: determining an activated region within the feature map of the first class based on feature values exceeding a threshold value; detecting an object motion region within the 2D data that spatially corresponds to the activated region and reflecting values of the object motion region into the feature map of the first class.

In some embodiments, the extracted motion information is 2D data, and the reflecting the motion information of the first object into the feature map of the first class corresponding to the first object may include: detecting a motion region of the first object from the 2D data using attribute information of the first object; and reflecting values of the motion region into the feature map of the first class.

In some embodiments, the performing the image segmentation may include reflecting the extracted motion information into the class-specific feature maps based on a weight, and the weight may be determined to be greater for lower performance of the deep learning model.

In some embodiments, the given image is an image of a user who participates in a video conference, and the method may further include: applying a virtual background set by the user to the current frame using a result of the image segmentation for the current frame.

According to another embodiments of the present disclosure, there is provided a system for image segmentation. The system may include: at least one processor; and a memory configured to store at least one instruction, wherein the at least one processor is configured to, by executing the at least one instruction stored in the memory, perform: acquiring a deep learning model trained through an image segmentation task; extracting motion information associated with a current frame of a given image; and performing image segmentation for the current frame by reflecting the extracted motion information into class-specific feature maps, the class-specific feature maps being generated by the deep learning model based on the current frame.

According to yet another embodiments of the present disclosure, there is provided a non-transitory computer-readable recording medium storing computer program executable by at least one processor to perform: acquiring a deep learning model trained through an image segmentation task; extracting motion information associated with a current frame of a given image; and performing image segmentation for the current frame by reflecting the extracted motion information into class-specific feature maps, the class-specific feature maps being generated by the deep learning model based on the current frame.

BRIEF DESCRIPTION OF THE DRAWINGS

The above and other aspects and features of the present disclosure will become more apparent by describing in detail exemplary embodiments thereof with reference to the attached drawings, in which:

FIG. 8 is a flowchart illustrating an image segmentation method according to some embodiments of the present disclosure;

DETAILED DESCRIPTION

Figure 1:
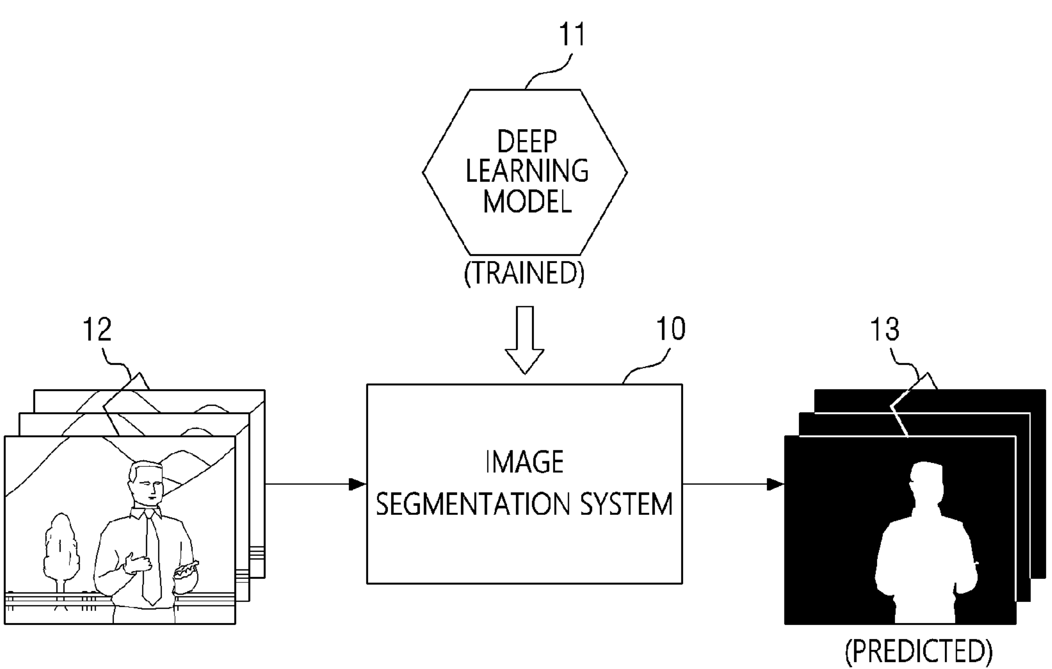
FIGS. 1 and 2 are schematic views illustrating the operation of an image segmentation system according to some embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Embodiments of the present disclosure will be described with reference to the attached drawings.

FIG. 1 is a schematic view illustrating the operation of an image segmentation system 10 according to some embodiments of the present disclosure.

Referring to FIG. 1, the image segmentation system 10 may be a computing device/system that performs image segmentation on an image (i.e., a video) consisting of multiple frames 12. For example, the image segmentation system 10 may generate (or output) predicted mask images 13 by performing frame-by-frame image segmentation using a trained deep learning model 11. For convenience, the image segmentation system 10 (and even the term "image segmentation") will hereinafter be abbreviated as the segmentation system 10 (and "segmentation").

The mask images 13 represent pixelwise class values and may also be referred to as "segmentation maps," "segmentation masks," "mask maps," "segmentation labels," or "mask labels."

Furthermore, the deep learning model 11, which is a neural network-based model for performing image segmentation, may also be referred to as a "segmentation model," "segmentation neural network," or "segmentation network." The exemplary configuration and operational principles of the deep learning model 11 will be described later with reference to FIG. 4.

Figure 2:
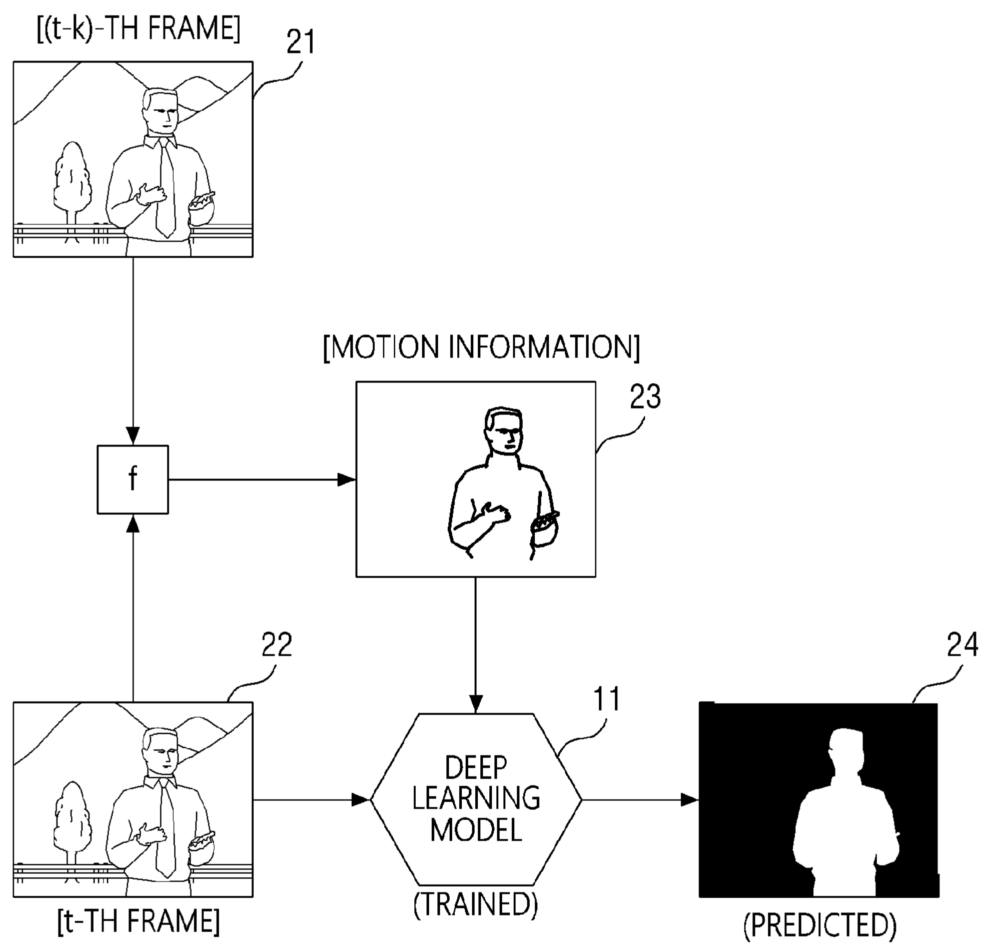

The segmentation system 10 may enhance the segmentation accuracy of the deep learning model 11 for an image (i.e., multiple frames) by utilizing motion information from objects within the image. For example, as illustrated in FIG. 2, the segmentation system 10 may extract motion information 23 based on the difference between a current frame 22 (e.g., a t-th frame) and a reference frame 21 (e.g., a (t−k)-th frame previous to the current frame 22) and may perform image segmentation by reflecting the motion information 23 into the deep learning model 11. In this manner, the accuracy of a segmentation result 24 for the current frame 22 may significantly improve, and the performance of the deep learning model 11 may also enhance without additional training. This embodiment will be described later in further detail with reference to FIGS. 3 through 8.

The segmentation system 10 may be implemented on at least one computing device. For example, all functionalities of the segmentation system 10 may be implemented on a single computing device. In another example, a first functionality of the segmentation system 10 may be implemented on one computing device, while a second functionality of the segmentation system 10 may be implemented on another computing device. In yet another example, a specific functionality of the segmentation system 10 may be implemented on multiple computing devices.

Here, the term "computing device" encompasses any device equipped with computing capabilities, and an example of such device will be described later with reference to FIG. 11.

A computing device, which is an assembly where various components (e.g., memories, processors, and the like) interact, may also be referred to as a "computing system." Also, the term "computing system" may also encompass the concept of a group of multiple computing devices interacting with each other.

A general description of the operation of the segmentation system 10 has been presented so far with FIGS. 1 and 2. Various methods that may be performed within the segmentation system 10 will hereinafter be described with reference to FIG. 3 and the subsequent figures.

For convenience, it is assumed that all steps/operations of the methods are performed within the segmentation system 10. Therefore, if the subject of a particular step/operation is not explicitly mentioned, it may be understood that the particular step/operation is still performed within the segmentation system 10. Additionally, for clarity within the present disclosure, when not directly referring to the diagrams, the reference number for the deep learning model 11 may be omitted when not directly referring to the accompanying figures, and may be varied depending on the embodiments.

Figure 3:
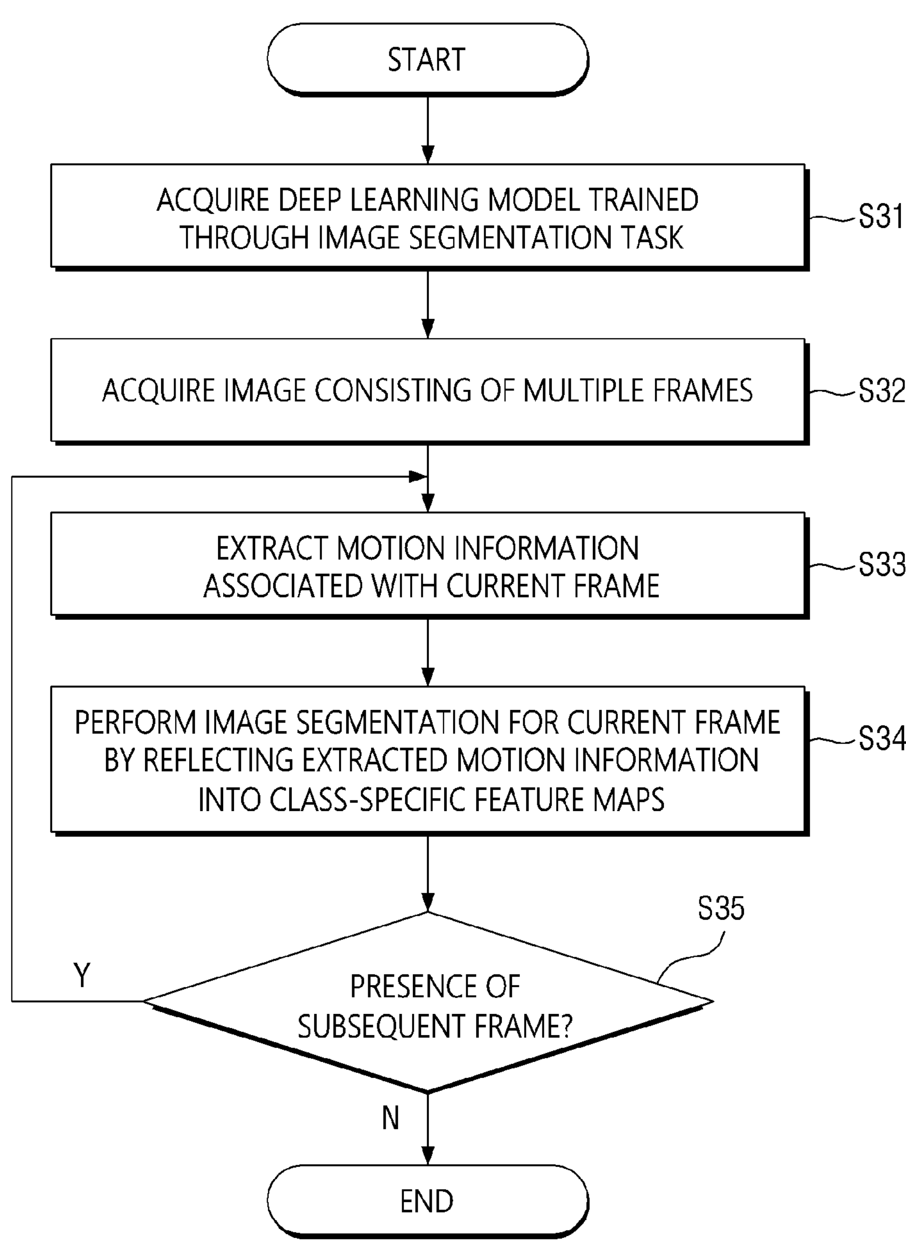
FIG. 3 is a flowchart illustrating an image segmentation method according to some embodiments of the present disclosure.

FIG. 3 is an exemplary flowchart of an image segmentation method according to some embodiments of the present disclosure. However, the embodiment of FIG. 3 is merely exemplary, and some steps may be added or omitted as needed.

Referring to FIG. 3, the image segmentation method according to some embodiments of the present disclosure may begin with S31, which involves acquiring a deep learning model (e.g., the deep learning model 11 of FIG. 1), trained through an image segmentation task. For example, the deep learning model may be obtained through an image segmentation task using a training set consisting of e segmentation tasks using a training set consisting of object images and corresponding mask images.

For a clearer understanding, the structure and operational principles of a deep learning model according to some embodiments of the present disclosure will hereinafter be described with reference to FIG. 4.

Figure 4:
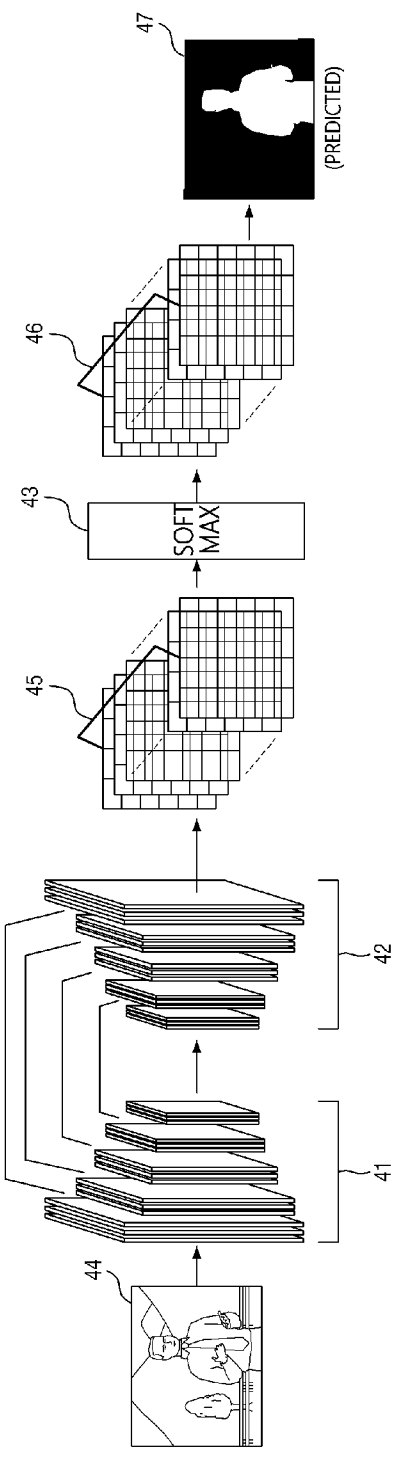
FIG. 4 is a schematic view illustrating the structure and operating principles of a deep learning model according to some embodiments of the present disclosure.

Referring to FIG. 4, the deep learning model according to some embodiments of the present disclosure may be configured to extract class-specific feature maps 45 for an input image 44 through a neural network operation and generate (or output) class-specific probability maps 46 based on the class-specific feature maps 45 (wherein pixel values in, for example, a first class-specific probability map, may represent the probabilities of the corresponding pixels belonging to a first class. The class-specific feature maps 45 may be generated with the same size as the input image 44, but the present disclosure is not limited thereto. The term "feature map" may also be referred to as an "activation map."

A predicted mask image 47 for the input image 44 may be generated by aggregating the class-specific probability maps 46 (e.g., by performing a pixelwise "argmax" operation to determine the class of each pixel). This aggregation process is already well known in the field to which the present disclosure pertains, and thus, a detailed description thereof will be omitted.

FIG. 4 illustrates an example where the deep learning model according to some embodiments of the present disclosure is implemented based on the U-Net architecture, with an encoder 41 corresponding to the contracting path and a decoder 42 corresponding to the expanding path, but the present disclosure is not limited thereto. That is, the deep learning model according to some embodiments of the present disclosure may be implemented in various other forms and structures.

Also, FIG. 4 illustrates that the class-specific probability maps 46 are generated from the class-specific feature maps 45 through a "softmax" operation 43. Alternatively, in some embodiments, a neural network operation (e.g., passing the class-specific feature maps 45 through a fully connected neural layer) may be further performed on the class-specific feature maps 45 before the "softmax" operation 43.

Referring back to FIG. 3, S32 through S35, which will be discussed later, may be understood as part of an inference process using a trained deep learning model.

In S32, an image consisting of multiple frames (i.e., frame images) may be acquired. For example, the segmentation system 10 may receive an image in real time through a capturing device such as a camera or may obtain an image in non-real time (e.g., retrieving a stored image from a storage).

In S33, motion information associated with a current frame (e.g., motion information of objects included in the current frame) may be extracted. For example, the segmentation system 10 may extract motion information using various computer vision algorithms (e.g., algorithms for object detection, motion detection, and object tracking) such as frame difference, optical flow, and background subtraction. For convenience, it is assumed that motion information may be extracted using, for example, a frame difference technique.

A motion information extraction process based on the frame difference technique will hereinafter be described with reference to FIG. 5.

Figure 5:
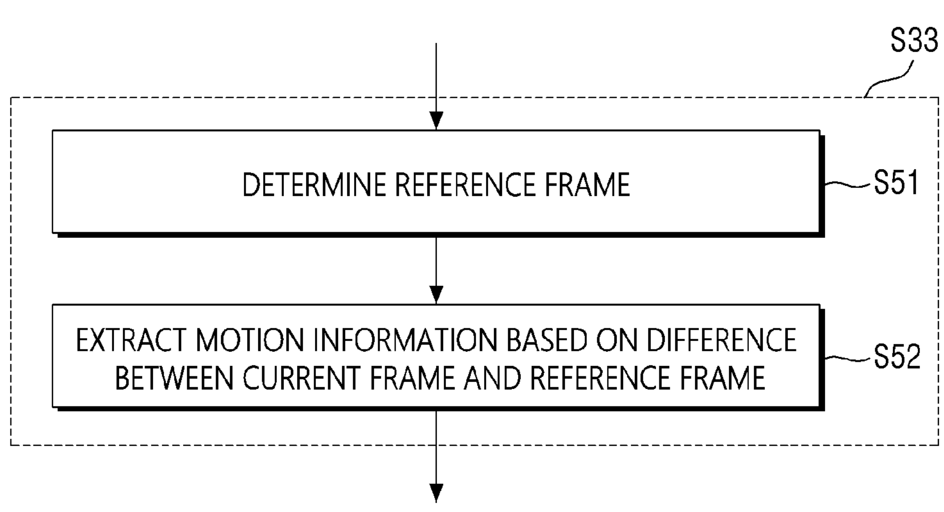
FIG. 5 is a detailed flowchart illustrating S33 of FIG. 3.

Referring to FIG. 5, a reference frame (e.g., the (t−k)-th frame 21 of FIG. 2) may be determined (or selected) from among several frames (e.g., among previous frames of the current frame) (S51). However, the present disclosure is not limited to this, and the method for determining the reference frame may vary.

In some embodiments, if the current frame corresponds to the t-th frame 22 of FIG. 2, the frame immediately preceding the t-th frame, i.e., the (t−1)-th frame, may be chosen as the reference frame.

Alternatively, in some embodiments, the reference frame may be determined based on the performance of the capturing device that has provided the image acquired in S32. Specifically, the difference in frame number between the current frame and the reference frame (e.g., "k" in the example of FIG. 2) may be determined based on the frame rate (or frames per second (FPS)) of the capturing device. For example, as the frame rate of the capturing device is higher, the frame number difference between the current frame and the reference frame may become greater because, with a high frame rate, the actual time difference between the current frame and the reference frame may be relatively small even if there is a significant frame number difference between the current frame and the reference frame. Conversely, as the frame rate of the capturing device is lower, the frame number difference between the current frame and the reference frame may become smaller. The value of "k" may represent the frame number difference between the current frame and the reference frame.

Alternatively, in some embodiments, the reference frame may be determined based on the resolution of a display to output the image acquired in S32 (e.g., the resolution of the display on each participant's terminal that outputs a conference video during a video conference). Specifically, the value of "k" may be determined based on the resolution of the display. For example, when the resolution of the display increases, the value of "k" may become smaller, and conversely, when the resolution of the display decreases, the value of "k" may become greater. Since higher display resolutions tend to highlight inaccuracies in segmentation results, precise detection of even fine movements (or motions) is necessary to improve the performance of the deep learning model (i.e., segmentation accuracy).

Alternatively, in some other embodiments, the reference frame may be determined based on the importance of each object. For example, as the importance of each object within the current frame increases, the value of "k" may become smaller, and as the importance of each object within the current frame decreases, the value of "k" may become greater. This is because there is a need to ensure a higher segmentation accuracy for objects with higher importance. The importance of an object may be determined based on attributes (e.g., type and size) of the object, the amount of utterances, and the role of the object. For example, in the case of a video conference service, the importance of each human object may be determined based on the utterance quantity of a corresponding user and/or his or her role in the conference (e.g., a mere participant, a speaker, a moderator, an organizer, etc.). In this example, human objects with greater utterance quantities or with specific roles as speakers, moderators, or organizers may be considered more important. In another example, human objects may be prioritized over inanimate objects. In another example, larger objects may be assigned higher importance.

Alternatively, in some other embodiments, the reference frame may be determined based on the performance of the deep learning model (i.e., segmentation accuracy). For example, the value of "k" may be smaller when the performance of the deep learning model is lower, and conversely, the value of "k" may be greater when the performance of the deep learning model is higher. This is because a deep learning model with poorer performance requires more precise motion information. The performance of the deep learning model may be evaluated using a separate test set, but the present disclosure is not limited thereto.

Alternatively, in some embodiments, the reference frame may be determined based on motion information associated with a previous frame (hereinafter, the previous motion information). For example, the value of "k" may be smaller when there is a greater amount of motion in the previous motion information, and conversely, the value of "k" may be greater when there is a smaller amount of motion in the previous motion information. The segmentation system 10 may determine the reference frame on an object-by-object basis. For example, the segmentation system 10 may determine a first reference frame for extracting current motion information of a first object (i.e., motion information associated with the current frame) based on previous motion information of the first object and a second reference frame for extracting current motion information of a second object based on previous motion information of the second object.

Alternatively, in some embodiments, the reference frame may be determined based on various combinations of the aforementioned examples or embodiments. For example, the segmentation system 10 may consider the aforementioned examples or embodiments collectively to determine the reference frame.

The value of "k" may either be a predefined value (e.g., a hyperparameter value set in advance in consideration of camera performance) or a value that may be dynamically determined (e.g., a value that may vary depending on previous motion information of each object).

In S52, motion information may be extracted based on the difference between the current frame and the reference frame. The extracted motion information includes shape information of each object within the current frame, such as outline information. The extracted motion information may take the form of two-dimensional (2D) data (e.g., an image) with the same size as the current frame, but the present disclosure is not limited thereto.

Referring back to FIG. 3, in S34, image mage segmentation for the current frame may be performed by reflecting the extracted motion information into the class-specific feature maps of the deep learning model. For example, the segmentation system 10 may reflect the extracted motion information into the class-specific feature maps of the deep learning model based on a pre-defined weight.

The weight of the extracted motion information may be determined based on the performance of the deep learning model. For example, the weight of the extracted motion information may become greater when the performance of the deep learning model is lower and smaller when the performance of the deep learning model is higher. This is because when the performance of the deep learning model is lower, there is a greater need to further refine the class-specific feature maps of the deep learning model.

For a clearer understanding, S34 will hereinafter be described in further detail with reference to FIGS. 6 and 7.

Figure 6:
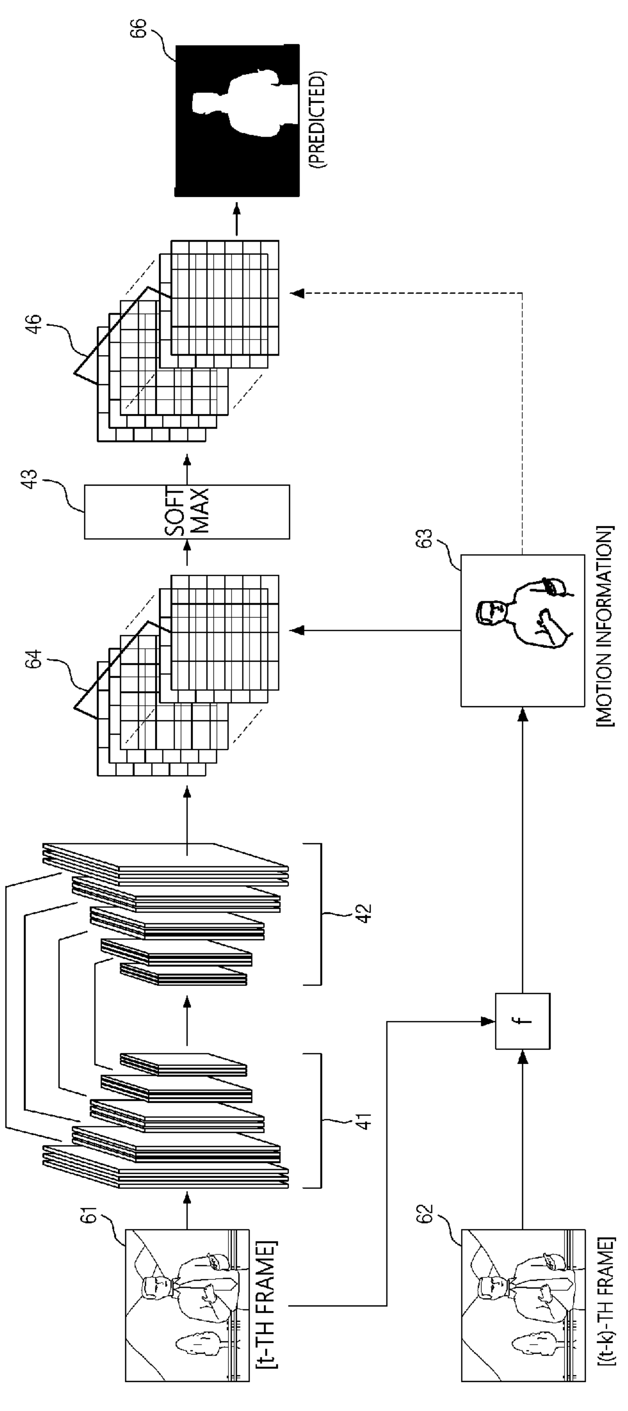
FIGS. 6 and 7 are schematic views illustrating S34 of FIG. 3.

Referring to FIG. 6, the segmentation system 10 may extract motion information 63 associated with a current frame 61 using a reference frame 62. The segmentation system 10 may then input the current frame 61 into a deep learning model (41 and 42) to extract class-specific feature maps 64.

Thereafter, the segmentation system 10 may reflect the motion information 63 into the class-specific feature maps 64. Specifically, the segmentation system 10 may reflect the motion information 63 into a feature map of a corresponding class based on a pre-defined weight. As a result, the feature map may be refined (or adjusted in such a manner that feature values associated with objects of the corresponding class may relatively increase (or may become more activated), while feature values not associated with the objects of the corresponding class, for example, feature values in the background area, may relatively decrease.

In other words, as illustrated in FIG. 6, the motion information 63, extracted based on factors such as frame differences, contains shape information of each object. Therefore, when reflecting the motion information 63 into the feature map of the class corresponding to each object, the effect of refining the feature map may be achieved. For example, as the feature values, particularly those associated with the outlines of objects that are challenging in terms of the difficulty of prediction, may be refined, the segmentation performance of the deep learning model may significantly improve.

FIG. 4 illustrates the reflection of the motion information 63 into class-specific feature maps 64 yet to be subject to the "softmax" operation 43, but the present disclosure is not limited thereto. Alternatively, in some other embodiments, the motion information 63 may be reflected into class-specific feature maps 64 after the application of the "softmax" operation 43 or into class-specific probability maps 65.

Meanwhile, when multiple objects exist in the current frame 61, the motion information 63 may contain motion information for the multiple objects. In this case, the segmentation system 10 may extract the motion information of the first object from the motion information 63 and reflect the extracted motion information into a feature map corresponding to the class of the first object. Similarly, the segmentation system 10 may extract the motion information of the second object from the motion information 63 and reflect the extracted motion information into a feature map corresponding to the class of the second object. However, the method for extracting object-specific motion information may vary.

Figure 7:
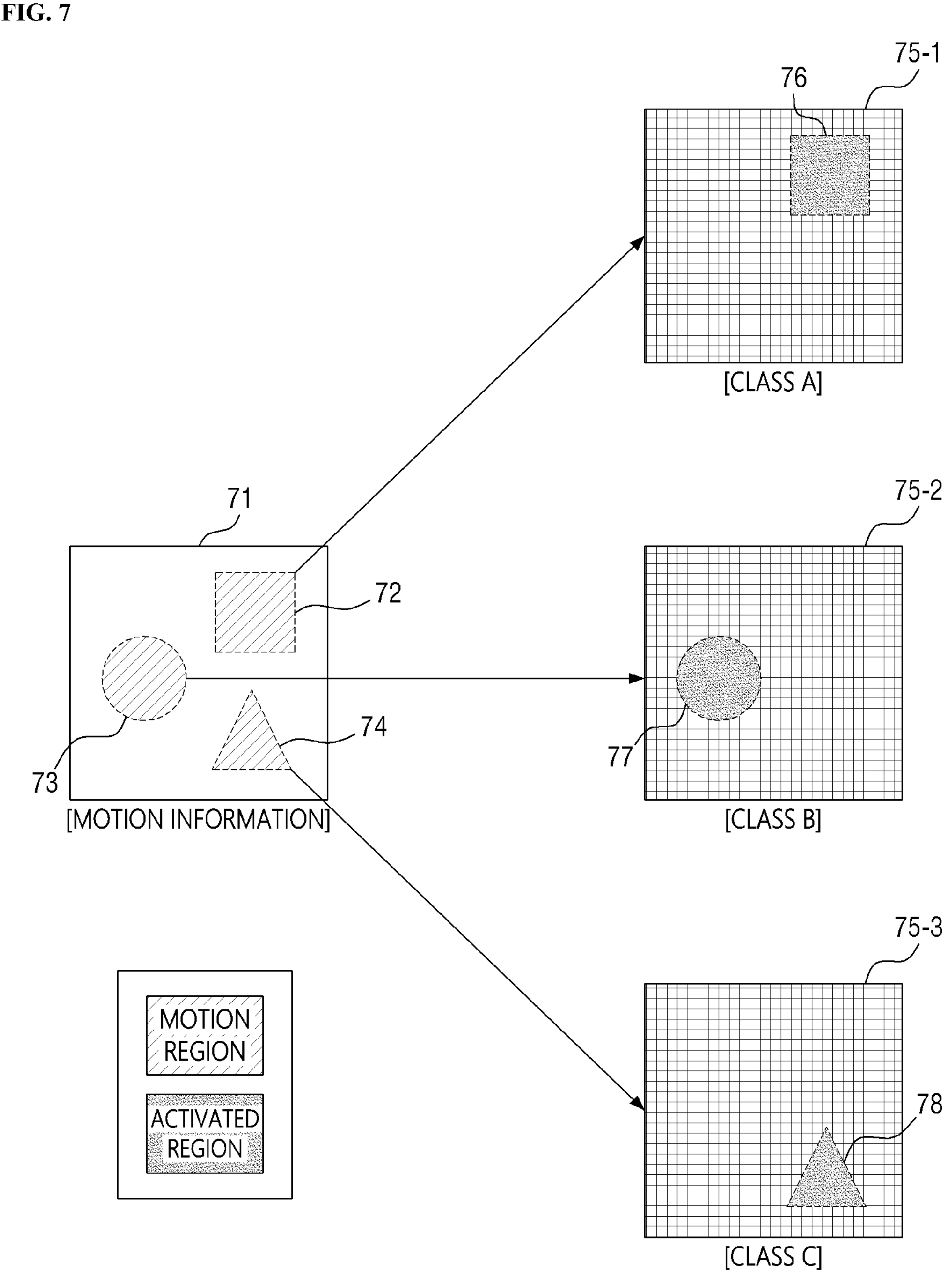

In some embodiments, as illustrated in FIG. 7, the segmentation system 10 may extract motion information of objects corresponding to each class based on the positional correspondence between an activated region 76 within a feature map 75-1 of a first class A and an object motion region 72 within motion information 71. For example, the segmentation system 10 may determine the activated region 76 within the feature map 75-1 with feature values exceeding a threshold value and may detect a region within the motion information 71 that corresponds spatially to the activated region 76 as an object motion region 72 corresponding to the first class A. Then, the segmentation system 10 may extract the values from the object motion region 72 and may reflect the extracted values into the feature map 75-1 of the first class A. Similarly, the segmentation system 10 may determine activated regions 77 and 78 and may extract values from other object motion regions 73 and 74 and reflect the extracted values into corresponding class-specific feature maps 75-2 and 75-3.

Alternatively, in some embodiments, the segmentation system 10 may extract motion information for a particular object using its attribute information (e.g., type, shape, size, etc.). For example, the segmentation system 10 may detect an area within the motion information 71 that matches the shape of the particular object as a motion region for the particular object, and may extract the values from the detected motion region and reflect the extracted values into a feature map corresponding to the class of the particular object. Alternatively, the segmentation system 10 may detect a human object from the current frame based on distinctive human features (e.g., landmarks such as faces and eyes) using, for example, a face detection technique, and may extract the values from the region of the detected human object and reflect the extracted value into a feature map of a class associated with humans (e.g., a human class).

Alternatively, in some embodiments, object-specific motion information may be extracted based on various combinations of the aforementioned examples or embodiments.

Referring back to FIG. 6, the segmentation system 10 may generate a prediction mask image 66 for the current frame 61 based on the class-specific feature maps 64 with the motion information 63 reflected thereinto (for more details on this process, refer to the explanation provided in FIG. 4).

So far, S34 has been described with reference to FIGS. 6 and 7. As mentioned earlier, the segmentation performance of the deep learning model may be enhanced by intervening (or adjusting/refining) the class-specific feature maps 64 using the motion information 63. This approach offers the advantage of improving segmentation performance without necessitating additional training for the deep learning model. In other words, the motion information 63 may be employed solely for enhancing the segmentation performance of the deep learning model without being utilized in the training of the deep learning model.

Referring back to FIG. 3, in S35, a determination may be made as to whether there exists a subsequent frame. If the subsequent frame exists, S33 and S34 may be repetitively performed for the subsequent frame.

Thus far, the image segmentation method according to some embodiments of the present disclosure has been described with reference to FIGS. 3 through 7. According to the embodiment of FIGS. 3 through 7, image segmentation for a current frame of a given image may be performed by reflecting motion information of each object associated with the current frame into class-specific feature maps of a trained deep learning model (i.e., a model trained through an image segmentation task). In this case, since the values of the class-specific feature maps are refined (or adjusted) by the motion information of each object, segmentation accuracy may be considerably improved, and the issue of varying segmentation accuracy from frame to frame due to object movement (motion) may be mitigated. Furthermore, since segmentation accuracy improves without the need for additional model training, computing costs may be reduced.

An image segmentation method according to some embodiments of the present disclosure will hereinafter be described with reference to FIG. 8. However, for clarity within the present disclosure, explanations that duplicate content from the previous embodiments will be omitted.

FIG. 8 is a flowchart illustrating an image segmentation method according to some embodiments of the present disclosure.

Referring to FIG. 8, the image segmentation method according to some embodiments of the present disclosure may begin with S81, which involves acquiring a trained deep learning model. Additional information regarding S81 may be found in the description provided for S31 of FIG. 3.

In S82, an image consisting of multiple frames may be acquired. Additional information regarding S82 may be found in the description provided for S32 of FIG. 3.

In S83, motion information associated with a current frame may be extracted. Additional information regarding S83 may be found in the description provided for S33 of FIG. 3.

In S84, based on the extracted motion information, a determination may be made as to whether the amount of motion is below a threshold value. For example, the segmentation system 10 may determine whether the amount of motion of each object within the current frame is below the threshold value. The method for calculating the amount of motion may vary, and the segmentation system 10 may also determine whether the motion of each object has been detected.

In S85, if the result of the determination performed in S84 indicates that the amount of motion of each object within the current frame is greater than or the same as the threshold value, image segmentation may be performed for the current frame based on the result of the determination performed in S84. Additional information regarding S85 may be found in the description provided for S34 of FIG. 3.

In S86, if the result of the determination performed in S84 indicates that the amount of motion of each object within the current frame is below the threshold value, the result of image segmentation for a previous frame may be reused. For example, the segmentation system 10 may use the result of image segmentation for the frame immediately preceding the current frame (or a nearby previous frame) for the current frame, instead of performing image segmentation on the current frame. In this manner, the computing cost required for image segmentation may be considerably reduced.

In S87, a determination may be made as to whether there exists a subsequent frame. Additional information regarding S87 may be found in the description provided for S35 of FIG. 3.

The image segmentation method according to some embodiments of this disclosure has been described so far with reference to FIG. 8. According to the embodiment of FIG. 8, when there is only minimal objection motion (or almost no object movement) within a current frame, the computing cost for image segmentation may be significantly reduced by reusing the result of image segmentation from a previous frame.

For a clearer understanding, exemplary usages of the image segmentation methods according to some embodiments of the present disclosure will hereinafter be described.

Figure 9:
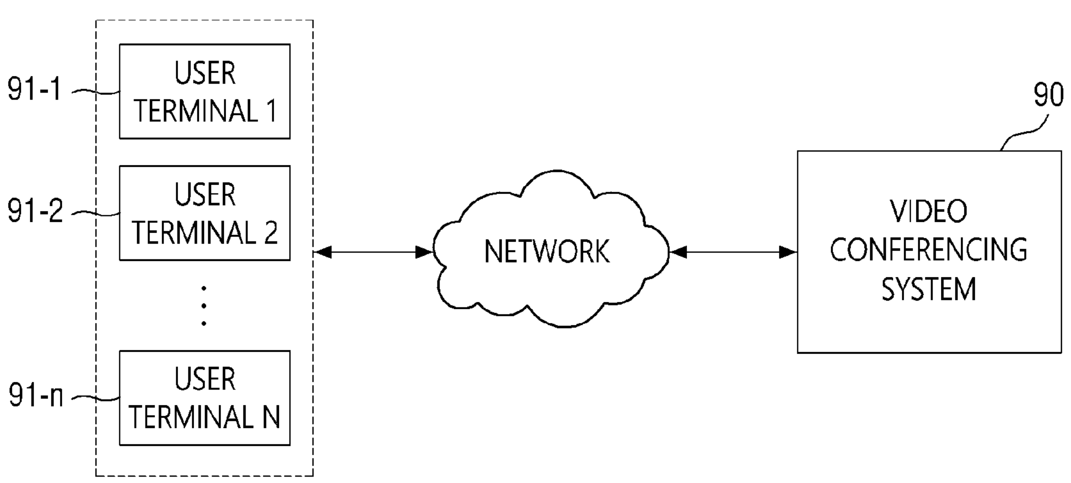
FIGS. 9 and 10 are schematic views illustrating video conferencing systems according to some embodiments of the present disclosure.

FIG. 9 is a schematic view illustrating the operational environment of a video conferencing (or call) system according to some embodiments of the present disclosure.

Referring to FIG. 9, a video conferencing system 90, which operates as a computing device/system that provides a video conferencing service, may interwork with user terminals 91-1 through 91-*n* to offer an online video conferencing service to users. For example, users may participate in a video conference hosted (or established) by a specific user through a video conferencing client installed on, for example, the user terminal 91-1, and may engage in conference activities using input/output devices (e.g., cameras, microphones, speakers, etc.) connected to the user terminal 91-1. If the video conferencing service is provided through the web, the video conferencing client may refer to a web browser. Reference number 91 may denote any individual user terminal (e.g., the terminal 91-1) or collectively refer to all user terminals 91-1 through 91-*n*.

In such an environment, the image segmentation methods according to some embodiments of the present disclosure (or modules implementing the image segmentation methods according to some embodiments of the present disclosure) may be utilized to implement the virtual background function of the video conferencing service, i.e., the function of replacing the actual background of each user with a virtual background image set by each user.

Figure 10:
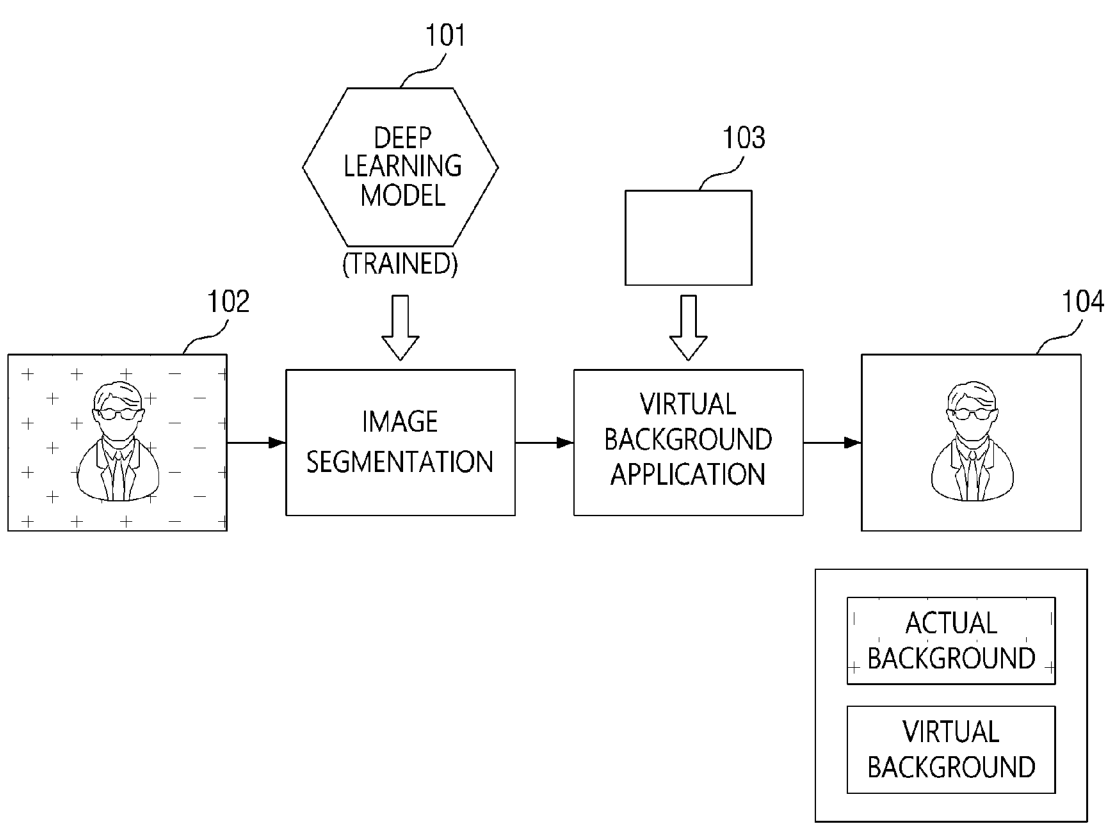

For example, referring to FIG. 10, it is assumed that the video conferencing system 90 is receiving an image of the specific user captured through his or her terminal 91. Then, the video conferencing system 90 may perform image segmentation for a current frame 102 using a trained deep learning model 101, which corresponds to the deep learning model 11 of FIG. 1. As described earlier, the video conferencing system 90 may perform image segmentation by reflecting motion information of a user object within the current frame 102. Thereafter, the video conferencing system 90 may apply a virtual background 103 set by the specific user using the result of image segmentation for the current frame 102. The method of applying the virtual background 103 to the current frame 102 is not particularly limited and may vary. For example, the virtual background 103 may be applied to the actual background area of the current frame 102. In another example, the user object within the current frame 102 may be extracted, and the extracted user object may be applied to the virtual background image 103. Thereafter, the video conferencing system 90 may transmit the current frame 102 with the virtual background 103 applied thereto to other user terminals 91.

However, in some cases, operations such as image segmentation and virtual background application may be performed within the video conferencing clients on the user terminals 91. For example, the video conferencing clients may generate images with virtual backgrounds applied thereto and may transmit the generated images to the video conferencing system 90.

So far, exemplary usages of the image segmentation methods according to some embodiments of the present disclosure have been described with reference to FIGS. 9 and 10. According to the embodiments of FIGS. 9 and 10, as the image segmentation accuracy of a deep learning model improves, the virtual background function of a video conferencing service may be easily (or accurately) implemented. Consequently, user satisfaction with the video conferencing service may be significantly enhanced.

An exemplary computing device that may implement the image segmentation system 10 will hereinafter be described with reference to FIG. 11.

Figure 11:
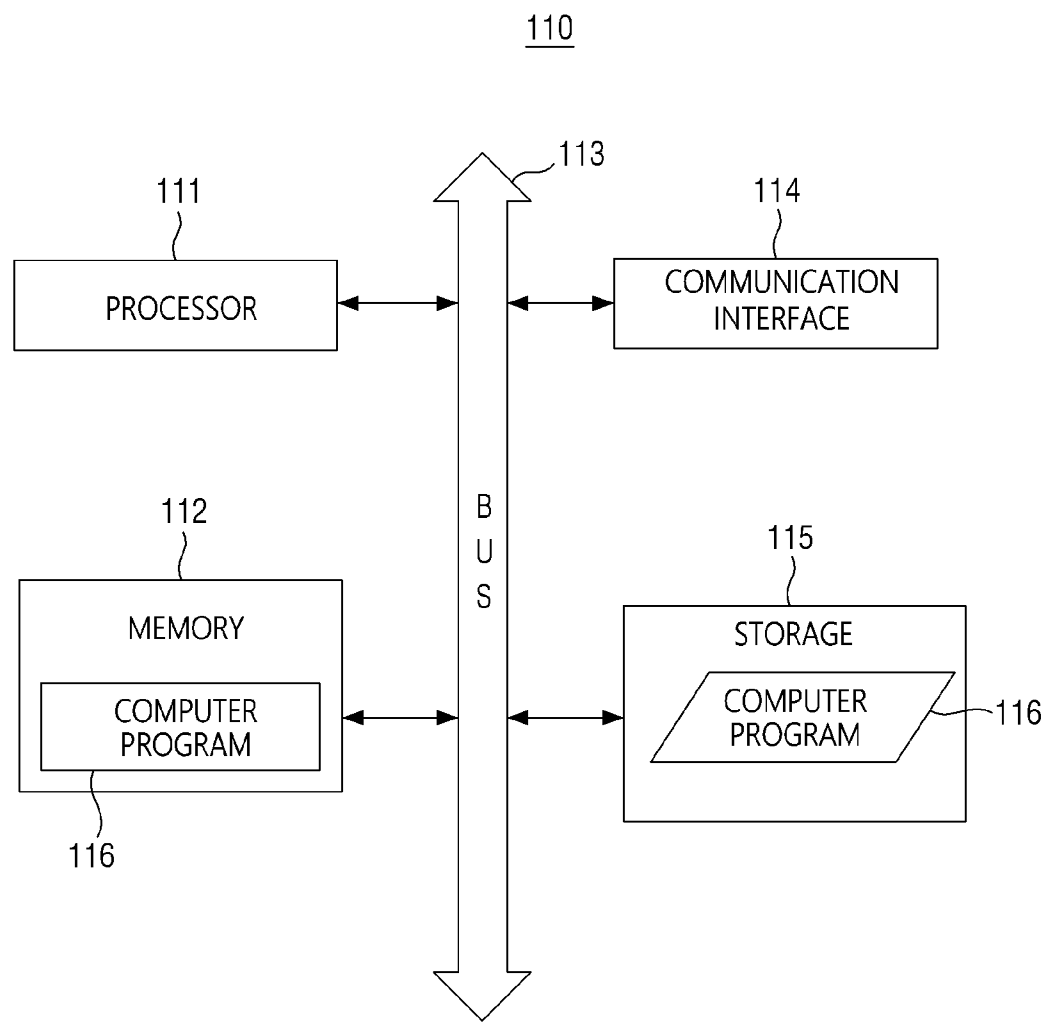
FIG. 11 is a block diagram of an exemplary computing device that may implement the image segmentation system according to some embodiments of the present disclosure.

FIG. 11 is a hardware configuration view of an exemplary computing device 110.

Referring to FIG. 11, the computing device 110 may include at least one processor 111, a bus 113, a communication interface 114, a memory 112, which loads a computer program 116 executed by the processor 111, and a storage 115, which stores the computer program 116. FIG. 11 only illustrates components relevant to the embodiments of the present disclosure, and it is obvious that the computing device 110 may further include other general components other than those illustrated in FIG. 11. In other words, the computing device 110 may be configured to include various components other than those illustrated in FIG. 11 or may be configured without some of the components illustrated in FIG. 11. The components of the computing device 110 will hereinafter be described.

The processor 111 may control the overall operations of the components of the computing device 110. The processor 111 may be configured to include at least one of a central processing unit (CPU), a micro-processor unit (MPU), a micro controller unit (MCU), a graphic processing unit (GPU), a neural processing unit (NPU), and any other known form of processor in the field to which the present disclosure pertains. The processor 111 may perform computations for at least one application or program for executing operations/methods according to some embodiments of the present disclosure. The computing device 110 may be equipped with one or more processors.

The memory 112 may store various data, commands, and/or information. The memory 112 may load the computer program 116 from the storage 115 to execute the operations/methods according to some embodiments of the present disclosure. The memory 112 may be implemented as a volatile memory such as a random-access memory (RAM), but the present disclosure is not limited thereto.

The bus 113 may provide communication functionality among the components of the computing device 110. The bus 113 may be implemented in various forms, including an address bus, a data bus, and a control bus.

The communication interface 114 may support both wired and wireless Internet communication for the computing device 110. Additionally, the communication interface 114 may also support various other communication methods. For this purpose, the communication interface 114 may be configured to include a communication module that is well known in the field to which the present disclosure pertains.

The storage 115 may temporarily store at least one computer program 116. The storage 115 may be configured to include a non-volatile memory (such as a read-only memory (ROM), an erasable programmable ROM (EPROM), an electrically erasable programmable ROM (EEPROM), or a flash memory), a hard disk, a removable disk, or any other well-known computer-readable medium in the field to which the present disclosure.

The computer program 116 may include one or more instructions that, upon being loaded into the memory 112, direct the processor 111 to perform the operations/methods according to some embodiments of the present disclosure. In other words, by executing the loaded instructions, the processor 111 may perform the operations/methods according to some embodiments of the present disclosure.

For example, the computer program 116 may include instructions to perform the following operations: acquiring a trained deep learning model through an image segmentation task; extracting motion information associated with a current frame of a given image; and performing image segmentation for the current frame by reflecting the extracted motion information in a class-specific feature map of the deep learning model. In this case, the segmentation system 10 may be implemented via the computing device 110.

In another example, the computer program 116 may include instructions to perform the following operations: acquiring a trained deep learning model through an image segmentation task; acquiring an image of a specific user participating in a video conference; extracting motion information associated with a current frame of the acquired image; performing image segmentation for the current frame by reflecting the extracted motion information into class-specific feature maps of the trained deep learning model; and applying a virtual background set by the specific user to the current frame using the result of the image segmentation for the current frame.

In some embodiments, the computing device 110 may refer to a virtual machine implemented based on cloud technology. For example, the computing device 110 may be a virtual machine operating on one or more physical servers within a server farm. In this example, at least some of the components of the computing device 110, i.e., the processor 111, the memory 112, and the storage 115, may be implemented as virtual hardware, and the communication interface 114 may be implemented as a virtual networking element such as a virtual switch.

An exemplary computing device 110 that may implement the system 10 has been described so far with reference to FIG. 11.

Various embodiments of the present disclosure and their effects have been described with reference to FIGS. 1 through 11.

According to the aforementioned some embodiments of the present disclosure, image segmentation for a current frame of a given image may be performed by reflecting the motion information of each object associated with the current frame into class-specific feature maps of a trained deep learning model (i.e., a model trained through an image segmentation task). In this case, since the values of the class-specific feature maps are refined (or adjusted) by the motion information of each object, segmentation accuracy may be considerably improved, and the issue of varying segmentation accuracy from frame to frame due to object movement (motion) may be mitigated. Furthermore, since segmentation accuracy improves without the need for additional model training, computing costs may be reduced.

Additionally, when there is minimal motion (e.g., almost no object movement), reusing the segmentation result from the previous frame may significantly reduce the computing cost associated with image segmentation.

Furthermore, by utilizing precise image segmentation results for images, the virtual background function of a video conferencing service may be easily implemented.

However, the technical concepts of the present disclosure are not limited to the effects set forth herein, and other effects not explicitly mentioned may be readily understood by those skilled in the art to which the present disclosure, from the provided description below.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for image segmentation performed by at least one processor, the method comprising:

acquiring a deep learning model trained through an image segmentation task;

extracting motion information associated with a current frame of a given image; and performing image segmentation for the current frame by reflecting the extracted motion information into class-specific feature maps, the class-specific feature maps being generated by the deep learning model based on the current frame, wherein the performing the image segmentation comprises reflecting the extracted motion information into the class-specific feature maps based on a weight.

2. The method of claim 1, wherein the extracted motion information is not used in training of the deep learning model.

3. The method of claim 1, wherein the performing the image segmentation comprises performing the image segmentation for the current frame based on an amount of motion associated with the current frame being equal or greater than a threshold value, and wherein a result of image segmentation for a previous frame is used in performing the image segmentation for the current frame based on the amount of motion associated with the current frame being less than the threshold value.

4. The method of claim 1, wherein the extracting the motion information comprises:

determining a reference frame from among a plurality of frames included in the given image; and extracting the motion information associated with the current frame based on a difference between the current frame and the reference frame.

5. The method of claim 4, wherein a difference in a frame number between the current frame and the reference frame is determined to be greater based on a higher frame rate of a device that has captured the given image.

6. The method of claim 4, wherein a difference in a frame number between the current frame and the reference frame is determined to be smaller based on a higher resolution of a display that outputs the given image.

7. The method of claim 4, wherein a difference in a frame number between the current frame and the reference frame is determined to be smaller based on a higher importance of an object within the current frame.

8. The method of claim 7, wherein the object corresponds to a user that participates in a video conference, and an importance of the object is determined based on at least one of an amount of an utterance or a role of the user during the video conference.

9. The method of claim 1, wherein the extracted motion information includes motion information of a first object and motion information of a second object, the first object and the second object being within the current frame, and the performing the image segmentation comprises:

reflecting the motion information of the first object into a feature map of a first class corresponding to the first object; and reflecting the motion information of the second object into a feature map of a second class corresponding to the second object.

10. The method of claim 9, wherein the extracted motion information is two-dimensional (2D) data, and the reflecting the motion information of the first object comprises:

determining an activated region within the feature map of the first class based on feature values exceeding a threshold value;

detecting an object motion region within the 2D data that spatially corresponds to the activated region; and reflecting values of the object motion region into the feature map of the first class.

11. The method of claim 9, wherein the extracted motion information is 2D data, and the reflecting the motion information of the first object comprises:

detecting a motion region of the first object from the 2D data using attribute information of the first object; and reflecting values of the motion region into the feature map of the first class.

12. The method of claim 1, wherein the weight is determined to be greater based on a lower performance of the deep learning model.

13. The method of claim 1, wherein the given image is an image of a user who participates in a video conference, and the method further comprises:

applying a virtual background set by the user to the current frame using a result of the image segmentation for the current frame.

14. A system for image segmentation comprising:

at least one processor; and a memory configured to store at least one instruction, wherein the at least one processor is configured to, by executing the at least one instruction stored in the memory, perform:

acquiring a deep learning model trained through an image segmentation task;

extracting motion information associated with a current frame of a given image; and performing image segmentation for the current frame by reflecting the extracted motion information into class-specific feature maps, the class-specific feature maps being generated by the deep learning model based on the current frame, wherein the performing the image segmentation comprises reflecting the extracted motion information into the class-specific feature maps based on a weight.

15. A non-transitory computer-readable recording medium storing computer program executable by at least one processor to perform:

acquiring a deep learning model trained through an image segmentation task;

extracting motion information associated with a current frame of a given image; and performing image segmentation for the current frame by reflecting the extracted motion information into class-specific feature maps, the class-specific feature maps being generated by the deep learning model based on the current frame, wherein the performing the image segmentation comprises reflecting the extracted motion information into the class-specific feature maps based on a weight.

* * * * *